(12) United States Patent
Jefferson, Jr.

(10) Patent No.: US 9,082,327 B1
(45) Date of Patent: Jul. 14, 2015

(54) LICENSE PLATE ENDS

(71) Applicant: Roosevelt Jefferson, Jr., Lafayette, CA (US)

(72) Inventor: Roosevelt Jefferson, Jr., Lafayette, CA (US)

( * ) Notice: Subject to any disclaimer, the term of this patent is extended or adjusted under 35 U.S.C. 154(b) by 0 days.

(21) Appl. No.: 14/586,583

(22) Filed: Dec. 30, 2014

Related U.S. Application Data

(60) Provisional application No. 62/033,594, filed on Aug. 5, 2014.

(51) Int. Cl.
| | | |
|---|---|---|
| *B60R 13/10* | (2006.01) | |
| *G09F 21/04* | (2006.01) | |
| *G09F 7/18* | (2006.01) | |

(52) U.S. Cl.
  CPC ............ *G09F 21/048* (2013.01); *B60R 13/105* (2013.01); *G09F 7/18* (2013.01)

(58) Field of Classification Search
  CPC ...................................................... B60R 13/105
  See application file for complete search history.

(56) References Cited

U.S. PATENT DOCUMENTS

| | | | | | |
|---|---|---|---|---|---|
| 2,312,183 | A | * | 2/1943 | Murfin | 40/210 |
| 2,603,013 | A | * | 7/1952 | Sherwood | 40/209 |
| 2,880,535 | A | * | 4/1959 | Bryant | 40/210 |
| 3,408,760 | A | * | 11/1968 | Barr | 40/210 |
| 3,908,296 | A | * | 9/1975 | Harrison | 40/210 |
| 2003/0061749 | A1 | * | 4/2003 | Bryant | 40/591 |
| 2008/0229635 | A1 | * | 9/2008 | Soldo | 40/210 |

* cited by examiner

*Primary Examiner* — Gary Hoge

(57) ABSTRACT

License plate ends mount behind and extend laterally from a license plate to display a printed graphic about the license plate. The license plate ends each include a display panel, a mounting bracket, a spacer and at least one mounting orifice. The mounting bracket is parallel to and offset from the display panel; connected to each other by the spacer. The at least one mounting orifice traverses through the mounting bracket and is positioned opposite the display panel across the mounting bracket. The at least one orifice is aligned behind the mounting holes of a license plate such that an individual license plate end can be mounted between a license plate and a vehicle. The printed graphic is positioned in the front surface of the display panel such that the printed graphic is easily seen.

17 Claims, 5 Drawing Sheets

LICENSE PLATE ENDS

The current application claims a priority to the U.S. Provisional Patent application Ser. No. 62/033,594 filed on Aug. 5, 2014.

FIELD OF THE INVENTION

The present invention relates generally to a license plate end addition. More specifically, the present invention relates to a license plate end which is mounted behind a license plate of a vehicle and extends to the sides to display a logo or printed graphic.

BACKGROUND OF THE INVENTION

When people desire to show support for a favorite sports team or a cause on a vehicle, they typically obtain vanity plates, bumper stickers, and window decals to mount onto their vehicle to display their pride. These traditional means, however, have several short-comings. Vanity plates, for example, require an additional fee to maintain the continued use for the specific alpha-numeric string. Even when the user is able to afford the extra fees, there is a chance that the alpha-numeric string is in use, as license plate sequences are unique. Bumper stickers are adhered or removably magnetized to the rear of a car. When adhered, bumper stickers are not easily removed and potentially damaging to the finish of the vehicle. When magnetized, bumper stickers can be easily removed without the aid of tools, and therefore easily repositioned and reoriented. Window decals can obstruct the view of the driver when placed on the rear window of a vehicle. Therefore, it is an object of the present invention to provide a means to display support for a sports team or cause, while being cost effective, easily removable, and not obstructive to a driver's vision.

The present invention is a license plate end to be mounted behind and extends laterally from the license plate. The display panels of the present invention include a printed or aesthetic design depicting the sports team or a cause that the user wishes to support. Since the present invention is supplemental to a traditional license plate, there is a single purchase fee; therefore, the present invention will have a lower overall cost in comparison to a vanity license plate. The present invention will be less damaging to the finish of a vehicle since it does not mount with an adhesive; instead, it makes use of the mounting screws which secure the traditional license plate in place. The use of mounting screws makes the orientation of the license plate end fixed while securing the present invention to the vehicle. Because the present invention is placed where the license plate mounts, the present invention is out of view while driving allowing for maximum vision while driving.

DETAIL DESCRIPTIONS OF THE INVENTION

All illustrations of the drawings are for the purpose of describing selected versions of the present invention and are not intended to limit the scope of the present invention.

Figure 1:
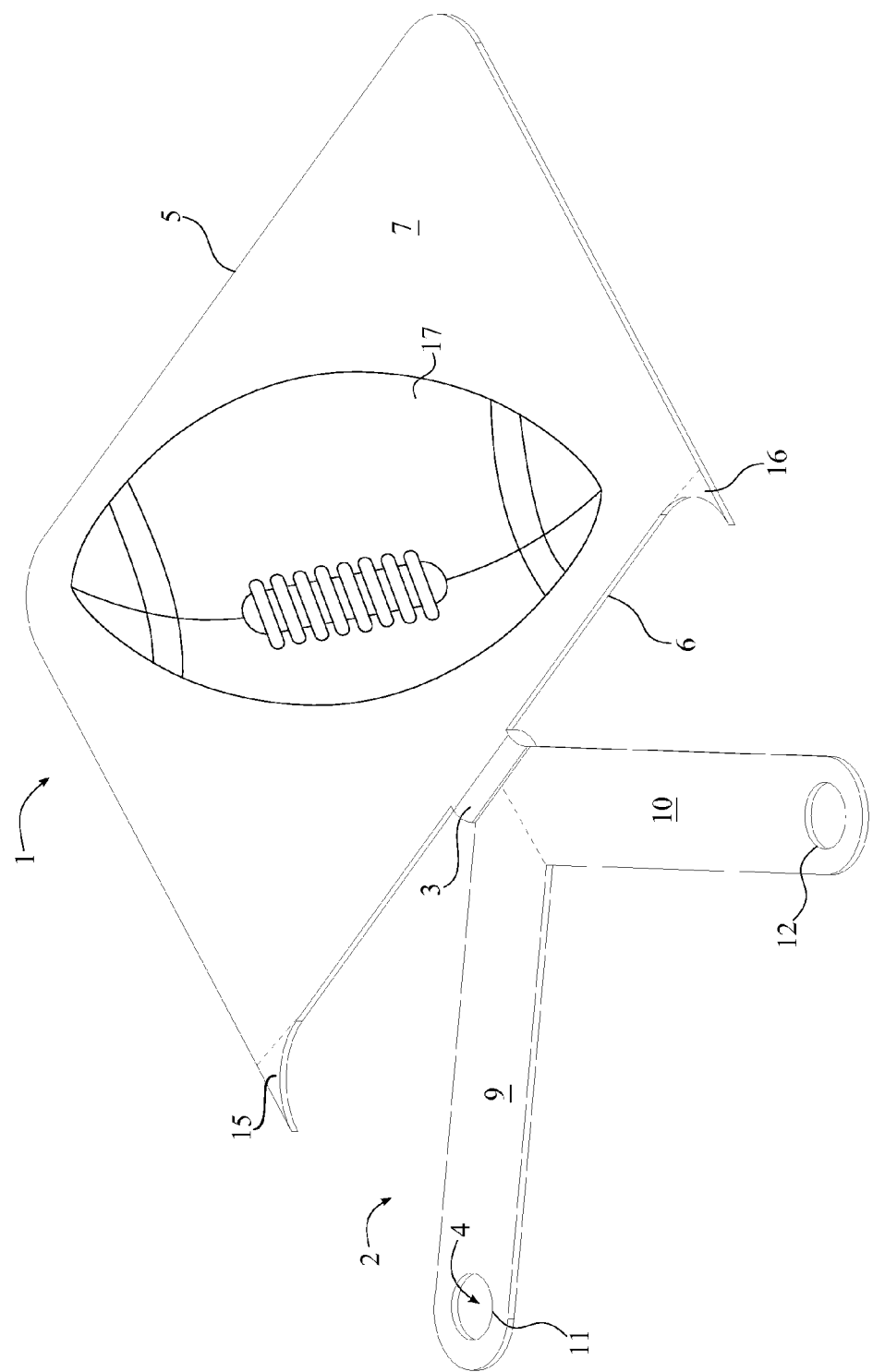
FIG. 1 is a perspective view of the present invention.

The present invention is for a license plate end, which is mounted behind and extends laterally from a traditional license plate. The present invention allows for the presentation of various designs, logos, and other images about the license plate. In accordance to FIG. 1 and FIG. 2, the present invention comprises a display panel 1, a mounting bracket 2, a spacer 3, and at least one mounting orifice 4. The display panel 1 provides a mounting point for a printed graphic 17. The mounting bracket 2 allows for the present invention to be secured to a vehicle and is positioned between the vehicle and a license plate 19. The spacer 3 connects and offsets the mounting bracket 2 from the display panel 1, which allows the display panel 1 to be positioned level with the license plate 19. The at least one mounting orifice 4, which traverses through the mounting bracket 2, provides the present invention with a means to be mounted onto a vehicle, through use of a peg, screw, bolt, or any similar fastening means. The display panel 1 comprises a distal lateral edge 5, a plate receiving lateral edge 6, a front surface 7, and a back surface 8. The license plate 19 is pressed against the plate receiving lateral edge 6 and the distal lateral edge 5 is the furthest edge from the license plate 19. The distal lateral edge 5 and the plate receiving lateral edge 6 are positioned opposite to each other across the display panel 1 and are positioned between the front surface 7 and the back surface 8, as shown in FIG. 3.

In accordance to the preferred embodiment, the spacer 3 is centrally positioned along the plate receiving lateral edge 6. The mounting bracket 2 is positioned parallel to and is offset from the display panel 1. The mounting bracket 2 is adjacently connected to the plate receiving lateral edge 6 by the spacer 3. The spacer 3 extends from the back surface 8 away from the front surface 7. The at least one mounting orifice 4 is positioned opposite to the plate receiving edge 6 across the mounting bracket 2. This configuration allows the license plate 19 to be mounted flush with the present invention onto a vehicle, displaying both the license plate 19 and the printed graphic 17 to anyone inspecting the rear of a vehicle.

Figure 2:
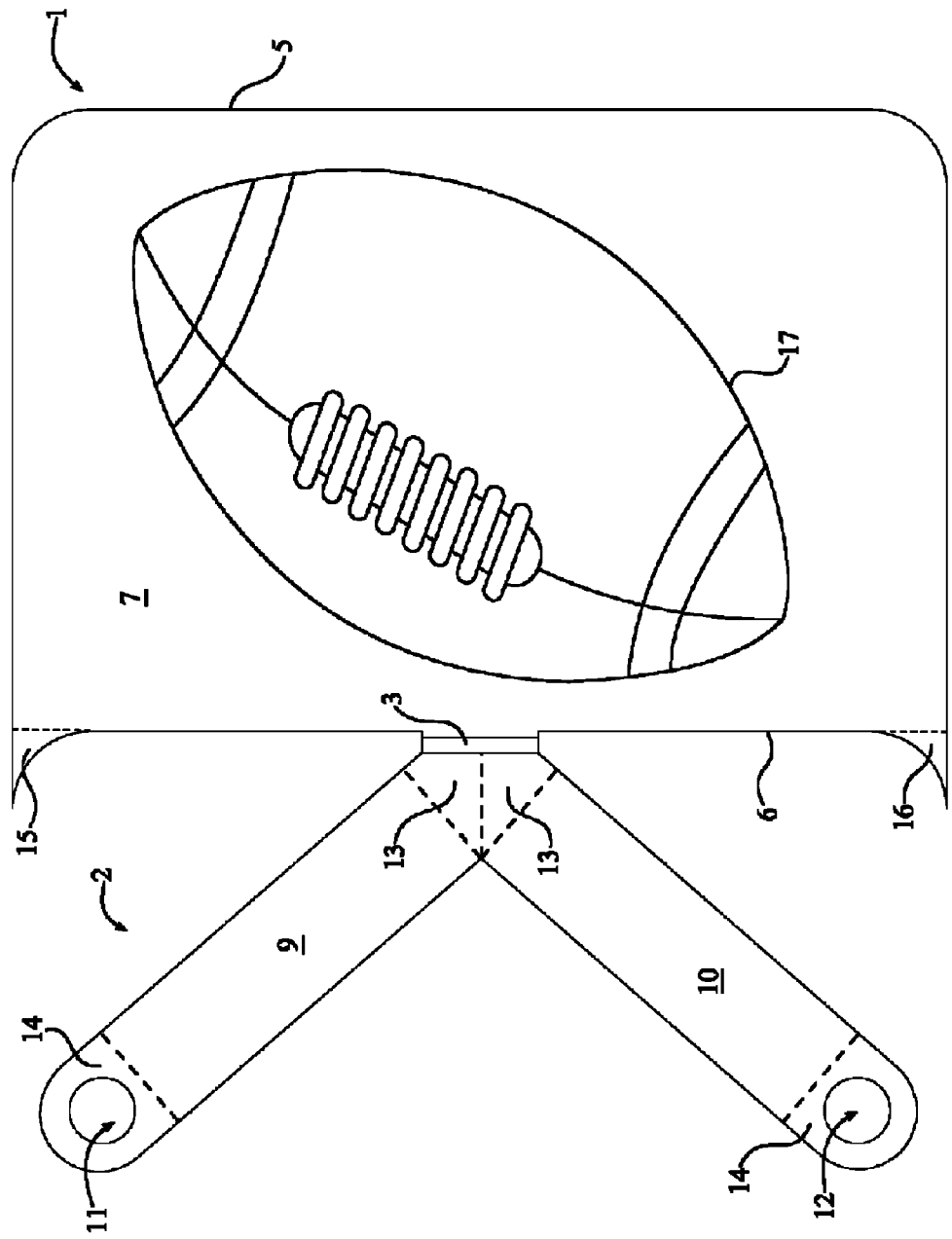
FIG. 2 is a front view of the present invention.
Figure 3:
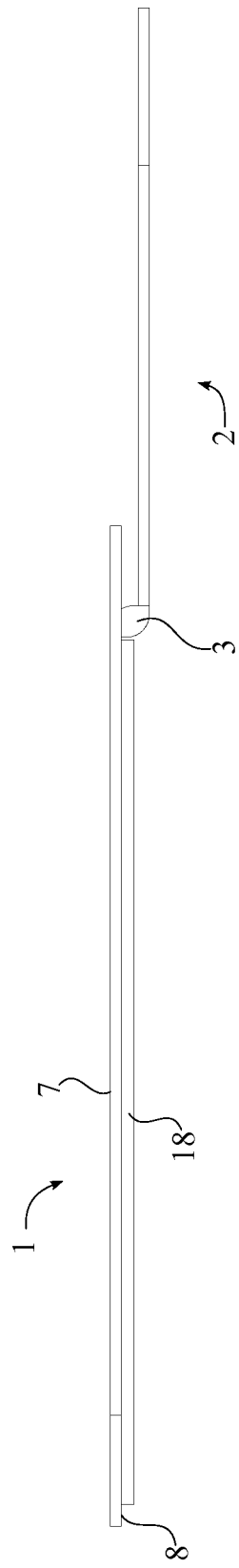
FIG. 3 is a side view of the present invention.
Figure 4:
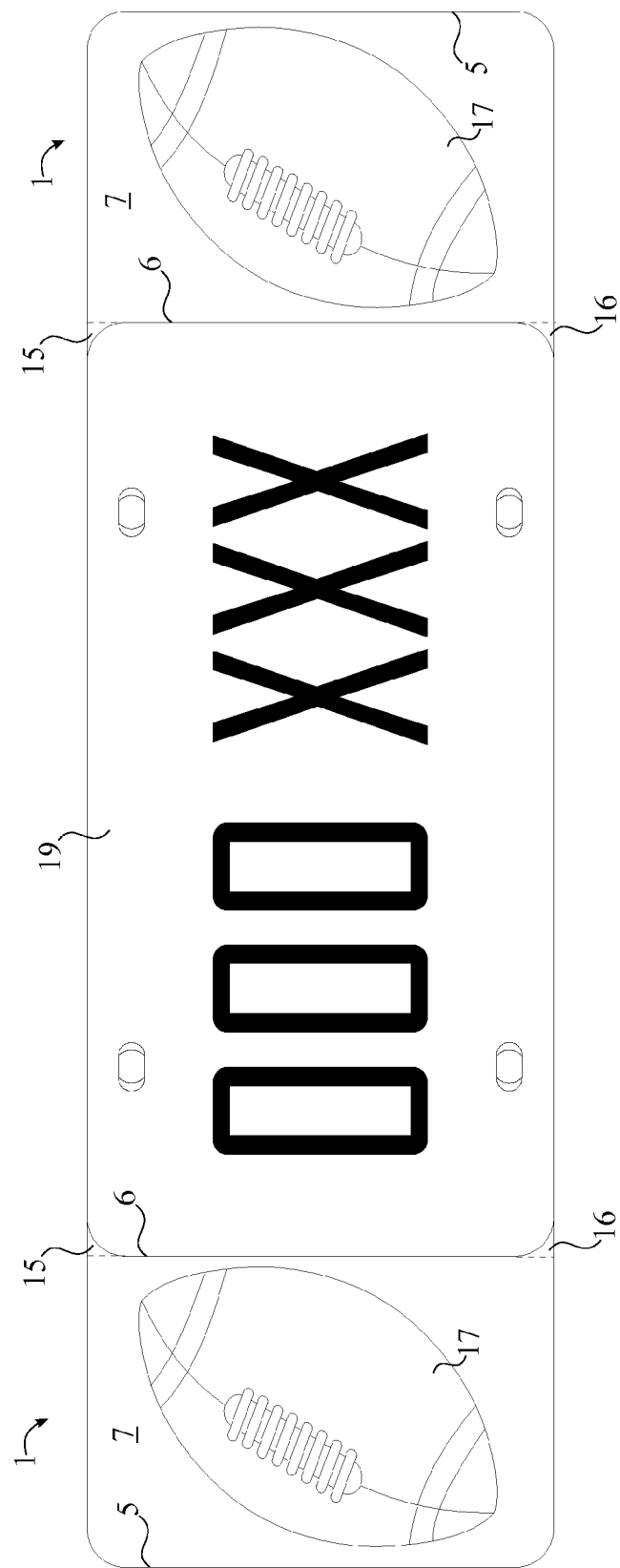
FIG. 4 is a front view of the present invention being mounted with a license plate.
Figure 5:
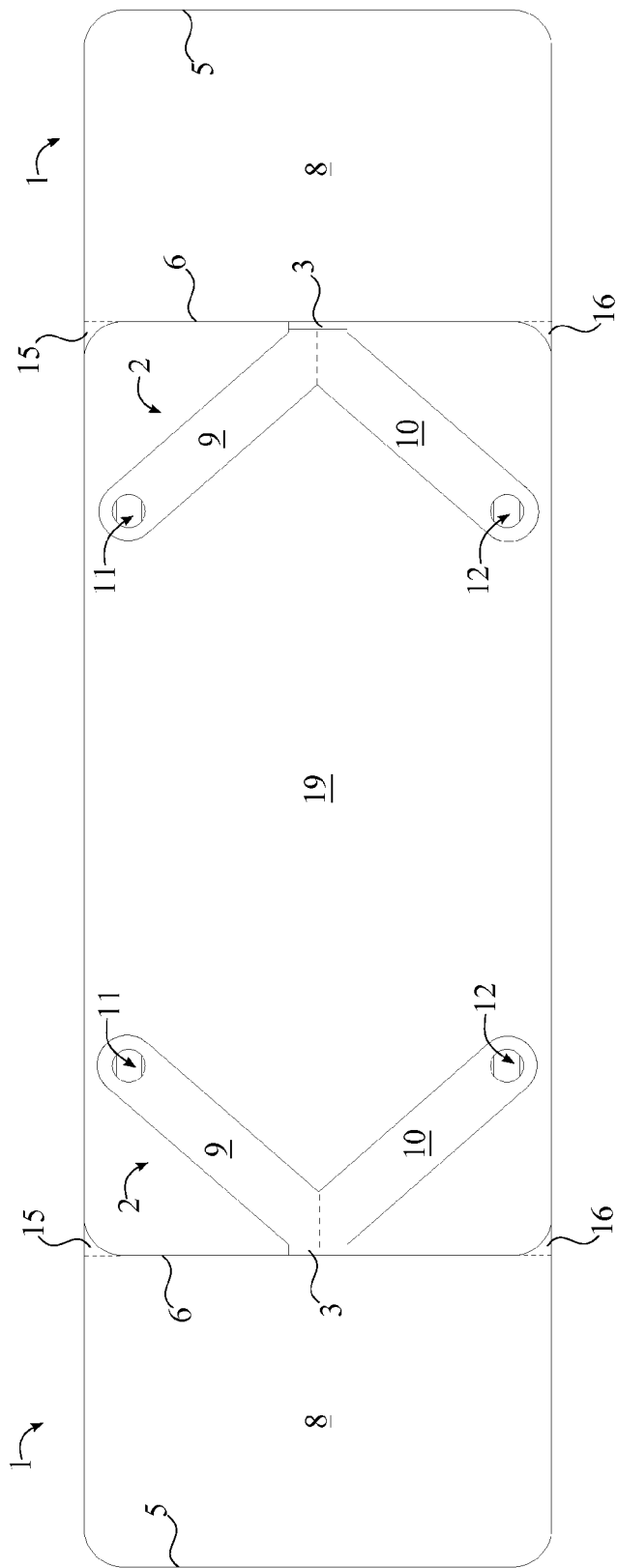
FIG. 5 is a rear view of the present invention being mounted with a license plate.

In accordance to FIG. 2 and FIG. 5, the mounting bracket 2 for some embodiments of the present invention comprises a first leg 9 and a second leg 10. The first leg 9 and the second leg 10 extend from the display panel 1 and allow the present invention to be mounted onto a vehicle through use of fasteners typically used for mounting the license plate 19. The first leg 9 and the second leg 10 each comprise a proximal end 13 and a distal end 14. The proximal end 13 for the first leg 9 and the proximal end 13 of the second leg 10 provide a point for the mounting bracket 2 to connect to the display panel 1 through means of the spacer 3. The distal edge 14 of both the first leg 9 and the second leg 10 provides a support which the at least one mounting orifice 4 to traverse through. The proximal end 13 of the first leg 9 and the proximal end 13 of the second leg 10 are adjacently connected to the plate receiving lateral edge 6. The distal end 14 of the first leg 9 is opposite the plate receiving lateral edge 6 along the first leg 9. Similarly, the distal end 14 of the second leg 10 is opposite the plate receiving lateral edge 6 along the second leg 10.

Further in accordance to the preferred embodiment, the at least one mounting orifice 4 comprises a first orifice 11 and a second orifice 12. The first orifice 11 traverses through the distal end 14 of the first leg 9 to provide a means of mounting the present invention onto a vehicle. Similarly, the second orifice 12 traverses through the distal end 14 of the second leg 10, also providing a means to mount the present invention onto a vehicle. A bolt, screw, or similar means of attachment is inserted through an orifice in the license plate 19, the first orifice 11 or the second orifice 12, and finally a mounting point on the vehicle, securing the license plate 19 and the present invention to the vehicle. The proximal end 13 of the first leg 9 and the proximal end 13 of the second leg 10 are connected adjacent to each other at the spacer 3. The first leg 9 is oriented at an angle with the second leg 10, wherein the spacer 3 is a vertex of the angle. While it is preferred that the mounting bracket 2 is an angle bracket, alternate embodiments allow for other configurations of the first leg 9 and the second leg 10.

An object of the preferred invention is to display a printed graphic 17 around a license plate 19, while properly displaying the license plate 19 in accordance to state and country laws. The printed graphic 17 is positioned onto the front surface 7 such that the printed graphic 17 is easily viewed alongside the alpha-numeric string of the license plate 19. The present invention conforms to the edges of the license plate 19, as shown in FIG. 1, FIG. 2, FIG. 4 and FIG. 5. The present invention further comprises a first fillet-receiving protrusion 15 and a second fillet-receiving protrusion 16. The first fillet-receiving protrusion 15 and the second fillet-receiving protrusion 16 are positioned opposite each other along the plate receiving lateral edge 6. The first fillet-receiving protrusion 15 and the second fillet-receiving protrusion 16 are connected to the plate receiving lateral edge 6. The first fillet-receiving protrusion 15 and the second fillet-receiving protrusion 16 conform to the rounded corners of a typical license plate 19.

In some embodiments of the present invention, the present invention further comprises a padded layer 18, as depicted in FIG. 3. The padded layer 18 is connected across the back surface 8. The padded layer 18 is cushioning material which protects the finish of the vehicle from scratching, marring, and other damage due to vibration from vehicle movement.

Although the invention has been explained in relation to its preferred embodiment, it is to be understood that many other possible modifications and variations can be made without departing from the spirit and scope of the invention as hereinafter claimed.

What is claimed:
1. A license plate end comprises:
a display panel;
a mounting bracket;
a spacer;
at least one mounting orifice;
a padded layer;
the display panel comprises a distal lateral edge, a plate receiving lateral edge, a front surface, and a back surface;
the distal lateral edge and the plate receiving lateral edge being positioned between the front surface and the back surface;
the plate receiving lateral edge being positioned opposite to the distal lateral edge across the display panel;
the mounting bracket being positioned parallel to the display panel;
the mounting bracket being positioned offset from the display panel;
the mounting bracket being adjacently connected to the plate receiving lateral edge by the spacer;
the at least one mounting orifice traversing through the mounting bracket;
the at least one mounting orifice being positioned opposite to the plate receiving lateral edge across the mounting bracket; and
the padded layer being connected across the back surface.

2. The license plate end as claimed in claim 1 comprises:
the mounting bracket comprises a first leg and a second leg;
the first leg and the second leg each comprise a proximal end and a distal end;
the proximal end of the first leg being adjacently connected to the plate receiving lateral edge;
the proximal end of the second leg being adjacently connected to the plate receiving lateral edge;
the distal end of the first leg being opposite the plate receiving lateral edge along the first leg; and
the distal end of the second leg being opposite the plate receiving lateral edge along the second leg.

3. The license plate end as claimed in claim 2 comprises:
the at least one mounting orifice comprises a first orifice and a second orifice;
the first orifice traversing through the distal end of the first leg; and
the second orifice traversing through the distal end of the second leg.

4. The license plate end as claimed in claim 2 comprises:
the proximal end of the first leg and the proximal end of the second leg being connected adjacent to each other at the spacer; and
the first leg being oriented at an angle with the second leg, wherein the spacer is a vertex of the angle.

5. The license plate end as claimed in claim 1 comprises:
a first fillet-receiving protrusion;
a second fillet-receiving protrusion;
the first fillet-receiving protrusion and the second fillet-receiving protrusion being positioned opposite to each other along the plate receiving lateral edge; and
the first fillet-receiving protrusion and the second fillet-receiving protrusion being connected perpendicular to the plate receiving lateral edge.

6. The license plate end as claimed in claim 1 comprises:
a printed graphic; and
the printed graphic being positioned onto the front surface.

7. The license plate end as claimed in claim 1 comprises:
the spacer being centrally positioned along the plate-receiving lateral edge; and
the spacer being extended from the back surface.

8. A license plate end comprises:
a display panel;
a mounting bracket;
a spacer;
at least one mounting orifice;
a printed graphic;
a padded layer;
the display panel comprises a distal lateral edge, a plate receiving lateral edge, a front surface, and a back surface;
the distal lateral edge and the plate receiving lateral edge being positioned between the front surface and the back surface;
the plate receiving lateral edge being positioned opposite to the distal lateral edge across the display panel;
the mounting bracket being positioned parallel to the display panel;
the mounting bracket being positioned offset from the display panel;
the mounting bracket being adjacently connected to the plate receiving lateral edge by the spacer;
the at least one mounting orifice traversing through the mounting bracket;
the at least one mounting orifice being positioned opposite to the plate receiving lateral edge across the mounting bracket;

the printed graphic being positioned onto the front surface; and the padded layer being connected across the back surface.

9. The license plate end as claimed in claim 8 comprises:

the mounting bracket comprises a first leg and a second leg;

the first leg and the second leg each comprise a proximal end and a distal end;

the proximal end of the first leg being adjacently connected to the plate receiving lateral edge;

the proximal end of the second leg being adjacently connected to the plate receiving lateral edge;

the distal end of the first leg being opposite the plate receiving lateral edge along the first leg; and the distal end of the second leg being opposite the plate receiving lateral edge along the second leg.

10. The license plate end as claimed in claim 9 comprises:

the at least one mounting orifice comprises a first orifice and a second orifice;

the first orifice traversing through the distal end of the first leg; and the second orifice traversing through the distal end of the second leg.

11. The license plate end as claimed in claim 9 comprises:

the proximal end of the first leg and the proximal end of the second leg being connected adjacent to each other at the spacer; and the first leg being oriented at an angle with the second leg, wherein the spacer is a vertex of the angle.

12. The license plate end as claimed in claim 8 comprises:

a first fillet-receiving protrusion;

a second fillet-receiving protrusion;

the first fillet-receiving protrusion and the second fillet-receiving protrusion being positioned opposite to each other along the plate receiving lateral edge; and the first fillet-receiving protrusion and the second fillet-receiving protrusion being connected perpendicular to the plate receiving lateral edge.

13. The license plate end as claimed in claim 8 comprises:

the spacer being centrally positioned along the plate-receiving lateral edge; and the spacer being extended from the back surface.

14. A license plate end comprises:

a display panel;

a mounting bracket;

a spacer;

at least one mounting orifice;

a printed graphic;

a padded layer;

the display panel comprises a distal lateral edge, a plate receiving lateral edge, a front surface, and a back surface;

the distal lateral edge and the plate receiving lateral edge being positioned between the front surface and the back surface;

the plate receiving lateral edge being positioned opposite to the distal lateral edge across the display panel;

the mounting bracket being positioned parallel to the display panel;

the mounting bracket being positioned offset from the display panel;

the mounting bracket being adjacently connected to the plate receiving lateral edge by the spacer;

the at least one mounting orifice traversing through the mounting bracket;

the at least one mounting orifice being positioned opposite to the plate receiving lateral edge across the mounting bracket;

the printed graphic being positioned onto the front surface;

the spacer being centrally positioned along the plate-receiving lateral edge;

the spacer being extended from the back surface; and the padded layer being connected across the back surface.

15. The license plate end as claimed in claim 14 comprises:

the mounting bracket comprises a first leg and a second leg;

the first leg and the second leg each comprise a proximal end and a distal end;

the proximal end of the first leg being adjacently connected to the plate receiving lateral edge;

the proximal end of the second leg being adjacently connected to the plate receiving lateral edge;

the distal end of the first leg being opposite the plate receiving lateral edge along the first leg; and the distal end of the second leg being opposite the plate receiving lateral edge along the second leg.

16. The license plate end as claimed in claim 15 comprises:

the at least one mounting orifice comprises a first orifice and a second orifice;

the first orifice traversing through the distal end of the first leg; and the second orifice traversing through the distal end of the second leg.

the proximal end of the first leg and the proximal end of the second leg being connected adjacent to each other at the spacer; and the first leg being oriented at an angle with the second leg, wherein the spacer is a vertex of the angle.

17. The license plate end as claimed in claim 14 comprises:

a first fillet-receiving protrusion;

a second fillet-receiving protrusion;

the first fillet-receiving protrusion and the second fillet-receiving protrusion being positioned opposite to each other along the plate receiving lateral edge; and the first fillet-receiving protrusion and the second fillet-receiving protrusion being connected perpendicular to the plate receiving lateral edge.

* * * * *